United States Patent
Kawai et al.

(10) Patent No.: US 6,998,976 B2
(45) Date of Patent: Feb. 14, 2006

(54) OPERATING DEVICE IN A VEHICLE

(75) Inventors: Takayoshi Kawai, Hoi-gun (JP);
Nobuaki Koshobu, Kariya (JP); Akira Kamiya, Inabe-gun (JP); Yuji Ito, Okazaki (JP)

(73) Assignee: Denso Corporation, Kariya (JP)

( * ) Notice: Subject to any disclaimer, the term of this patent is extended or adjusted under 35 U.S.C. 154(b) by 88 days.

(21) Appl. No.: 10/669,906

(22) Filed: Sep. 24, 2003

(65) Prior Publication Data

US 2004/0095366 A1 May 20, 2004

(30) Foreign Application Priority Data

Sep. 25, 2002 (JP) ............................. 2002-279471

(51) Int. Cl.
*G09F 9/00* (2006.01)
(52) U.S. Cl. .................. 340/461; 340/990; 340/995.1; 345/156
(58) Field of Classification Search ............... 340/461, 340/990, 995.1, 691.6; 345/156, 685
See application file for complete search history.

(56) References Cited

U.S. PATENT DOCUMENTS

| 6,128,012 | A  | * | 10/2000 | Seidensticker et al. ...... 345/685 |
| 6,415,224 | B1 | * | 7/2002  | Wako et al. ................. 701/208 |
| 6,707,387 | B1 | * | 3/2004  | Noguchi et al. .......... 340/691.6 |
| 6,760,431 | B1 | * | 7/2004  | Haimi-Cohen ......... 379/355.01 |
| 2002/0059603 | A1 | * | 5/2002 | Kelts ........................... 725/47 |

FOREIGN PATENT DOCUMENTS

JP       2002-120545       4/2002

* cited by examiner

*Primary Examiner*—Phung T. Nguyen
(74) *Attorney, Agent, or Firm*—Harness, Dickey & Pierce, PLC

(57) ABSTRACT

An operating device in a vehicle has hierarchical display screens. The hierarchical display screens have operation items for operating an operational object. An operation item on a lower-level screen is displayed on the top screen, based on the number of use of the operation item.

10 Claims, 5 Drawing Sheets

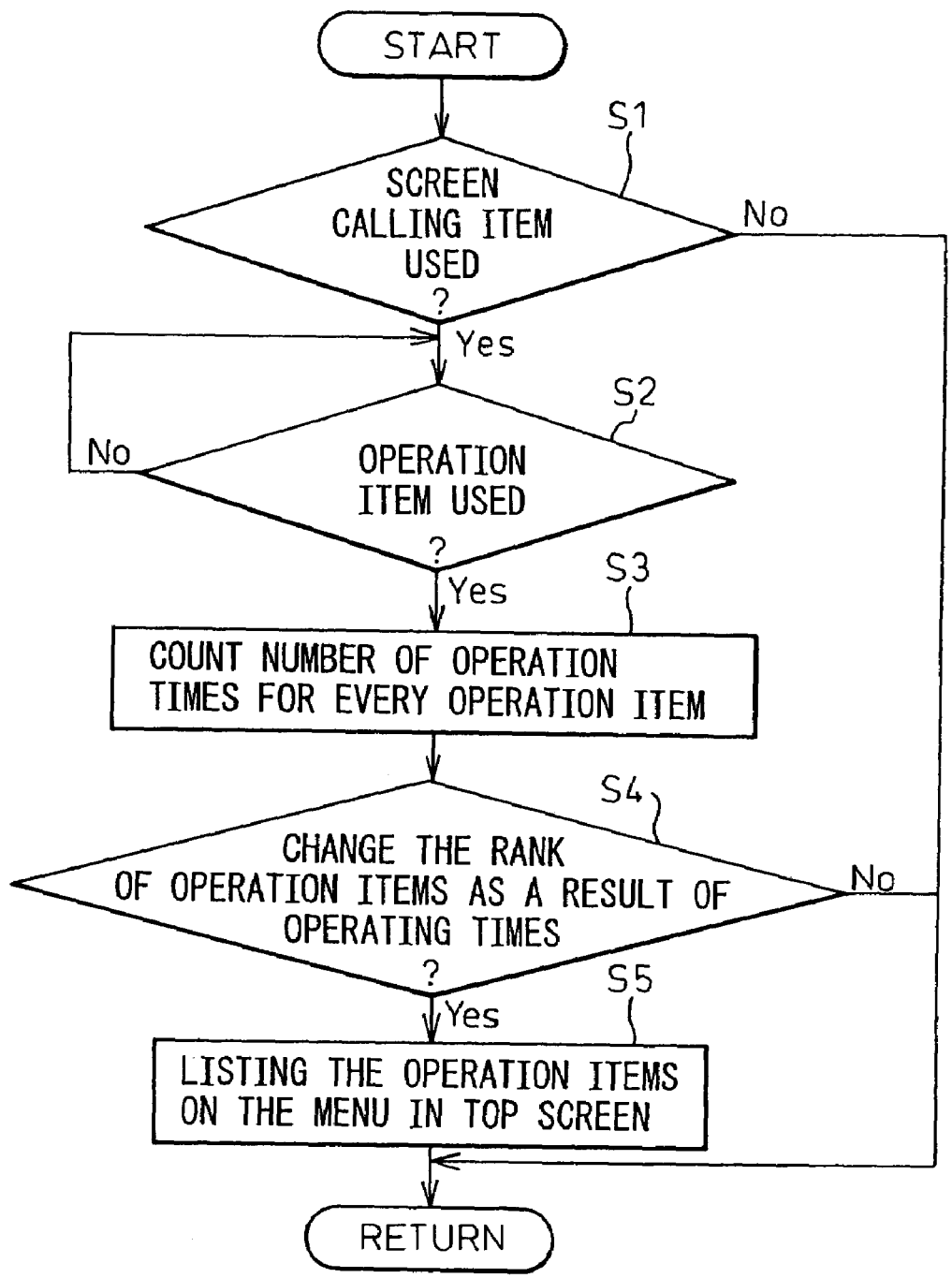

OPERATING DEVICE IN A VEHICLE

FIELD OF THE INVENTION

This invention relates to an operating device in a vehicle, and more particularly, to an operating device in a vehicle for operating an air conditioning system, an audio system, a car navigation system and so on.

BACKGROUND OF THE INVENTION

An instrument panel in a vehicle has many operating switches which include the control switches for the operating air conditioning system, the audio system and the car navigation system.

The number of the switches has increased in recent years, due to the development of information technology in vehicles and a growing need for driving support systems. Due to the increase in the number of the switches, it has been difficult to locate all the switches on the instrument panel. Therefore a display device, such as a liquid crystal display device, has been used as an operation panel to display switches or operation items on a screen, as shown in FIG. 4 of Japanese unexamined patent publication No.2002-120545.

The display device can display a screen having the operation items for controlling the system corresponding to any of the systems. However, if there are many operation items for one system, all of the items cannot be displayed on a single screen. The display device must have hierarchically structured screens for the systems, e.g. the air conditioning system, the audio system or the navigation system. Accordingly when one of the operation items is placed in a lower-level screen, a user must move sequentially from the top screen to a lower-level screen to operate the item. If the item is frequently used, the use of the items is complicated for the user.

SUMMARY OF THE INVENTION

One object of the present invention is to provide an easily operated operating device be in vehicle, the device having hierarchically allocated operation items.

The present invention is directed to an operating device in a vehicle that comprises hierarchical display screens on which an operation item for operating an operational object is displayed. The operation item is displayed on a predetermined screen, based on use of the operation item.

In other embodiments, the predetermined screen may be the top screen. The result may be the number of times of having used the item. The result can be stored in a portable storage medium. The operational object may be an air conditioning system, an audio system, a car navigation system, an audio-visual system or a telephone system.

BRIEF DESCRIPTION OF THE DRAWINGS

The invention will be described further by way of an example and with reference to the accompanying drawings. In the drawings:

FIG. 5 shows a flow diagram according to the embodiment.

PREFERRED EMBODIMENT OF THE INVENTION

Figure 1:
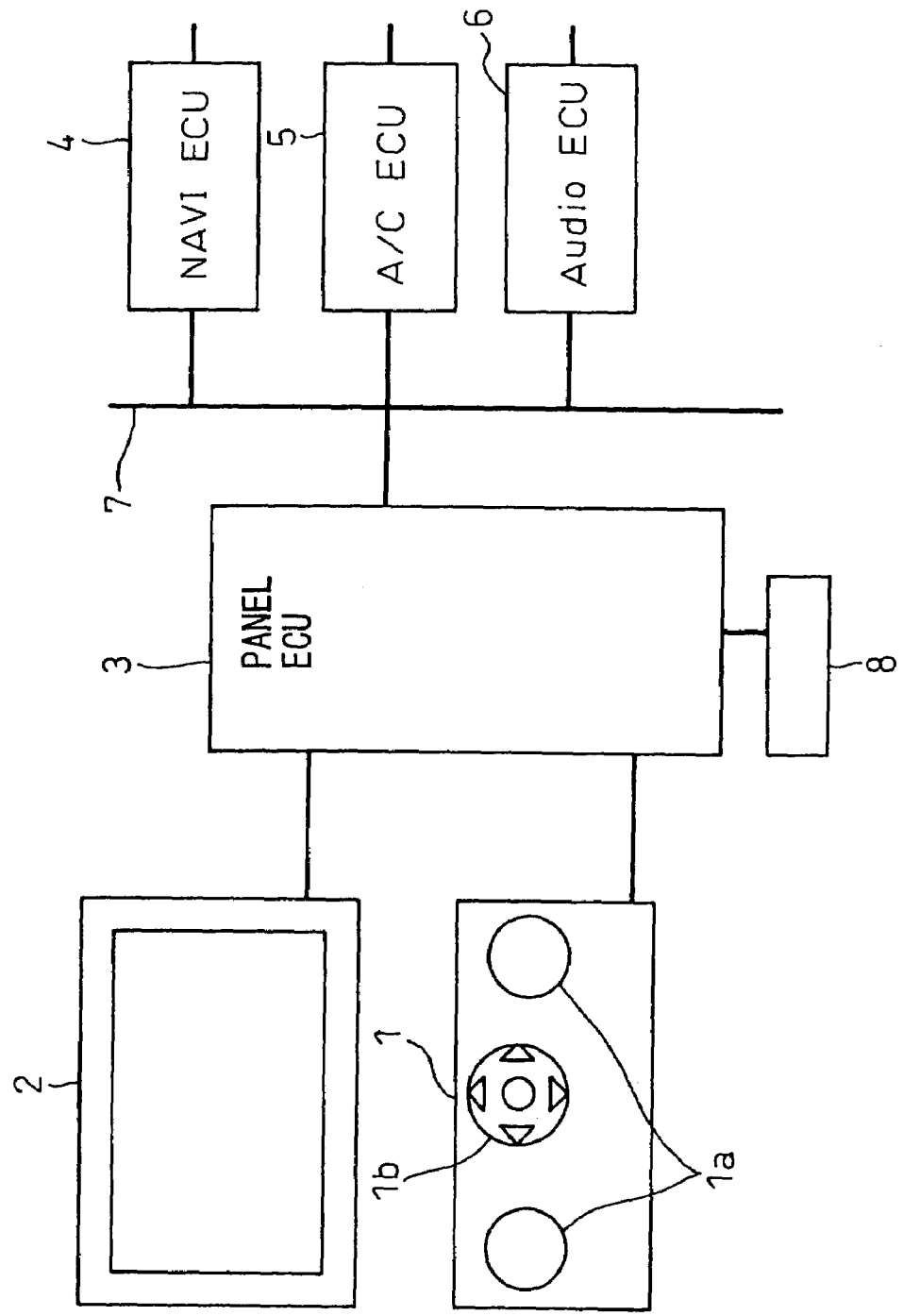
FIG. 1 shows a schematic diagram of an operating device according to an embodiment of the invention.

FIG. 1 is a schematic representation of an operating device in an embodiment of the present invention. In this example, the operating system can operate a navigation system (NAVI), an air conditioning system (A/C), or an audio system (Audio).

The operating device comprises an operating panel 1 and a display unit 2. The operating panel 1 has several rotary switches 1a and a four-direction (up, down, right and left) switch 1b having a center-push button. The switches can be used to operate the system. The display unit 2 may have a TFT (thin film transistor) liquid crystal display. The display screen can indicate measurements, system conditions, menu items and so on. The menu items, which are on a screen of the display panel, include at least a screen-calling item for displaying the other screen or an operation item for operating the system. The screen-calling item can be used to move the current screen to the calling screen for other operation items. The operation item can be used to execute a selected operation of the system.

Further, the operating device comprises an electronic control unit 4 (ECU 4) for control of the navigation system, an electronic control unit 5 for control of the air conditioning system (A/C), an electronic control unit 6 (ECU 6) for control of the audio system . An electronic control unit 3 (ECU 3) is used for transmitting and receiving signals through a multi-bus line 7. The ECU 3 can have two-way communication with the ECUs 4 to 6. Furthermore, ECU 3 can receive signals from the operating panel 1 to control the display unit 2 in order to display a screen or a menu screen. In addition, the ECU 3 may include a storage unit or a portable storage unit.

Figure 2:
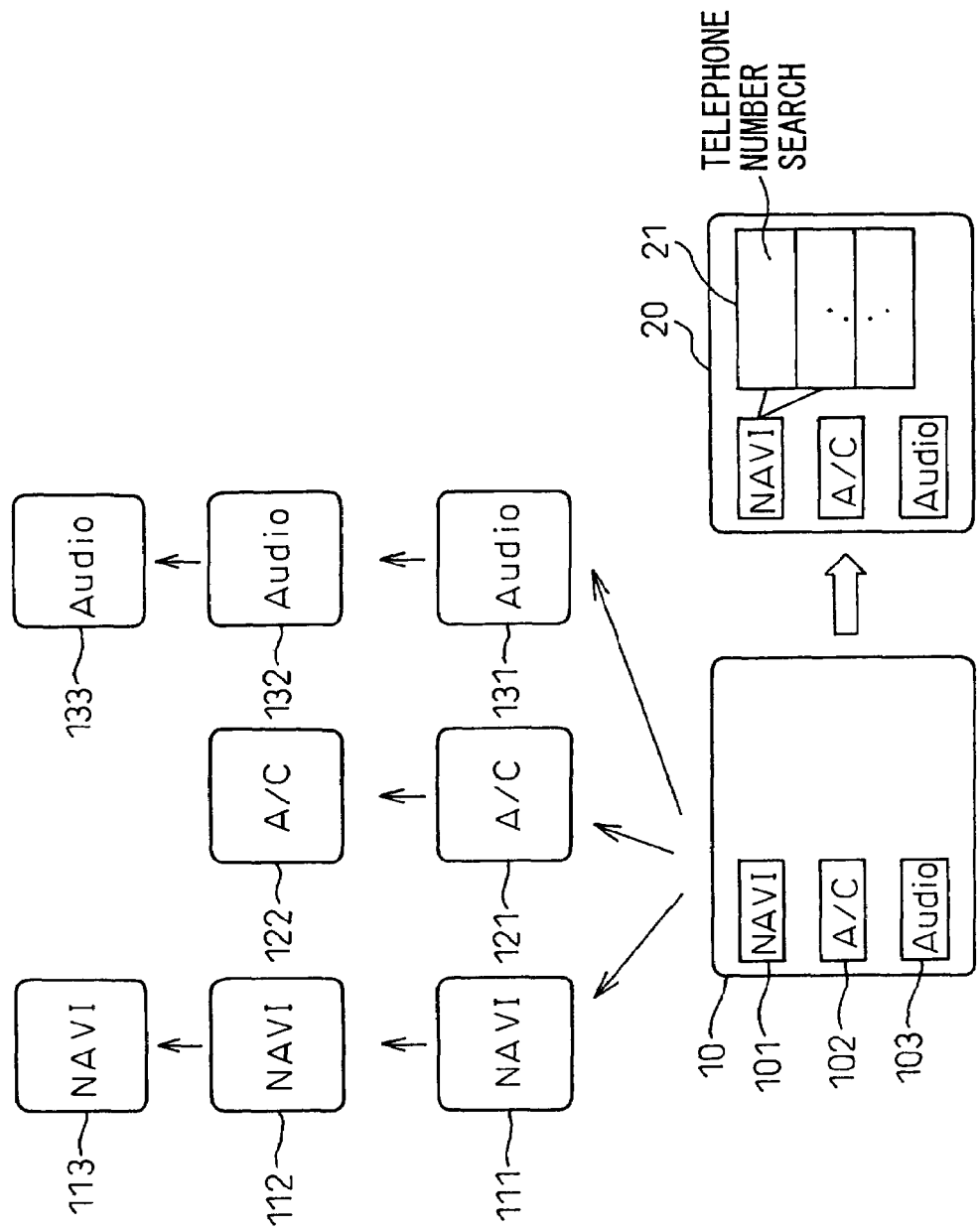
FIG. 2 shows a schematic representation of hierarchical display screens according to the embodiment.

FIG. 2 shows an example of hierarchical display screens according to the embodiment.

A screen 10 for selecting an operational system is first displayed on the display device as shown in FIG. 2. The screen 10 is an initial setting screen or a default screen, which is a level 0 screen. The screen 10 has three screen-calling items, i.e. NAVI 101, A/C 102 and Audio 103. These items are used to respectively display screens 111, 121 and 113 corresponding to the navigation system, air conditioning system and audio system. The screens 111, 121 and 131 are at level 1. In turn, screens 112, 122, 123 are at level 2 and screens 113, 133 are at level 3. As the number of items increases, the number of lower level screens increases.

According to the invention, as operating items are used many times, the screen 10 can be changed to a screen 20 with a pop-up menu, as described in detail bellow. The popup menu will include some of the often used operating items. For example, in FIG. 2, a pop up menu 21 of NAVI 101 includes an operation item for telephone number retrieval.

Figure 3:
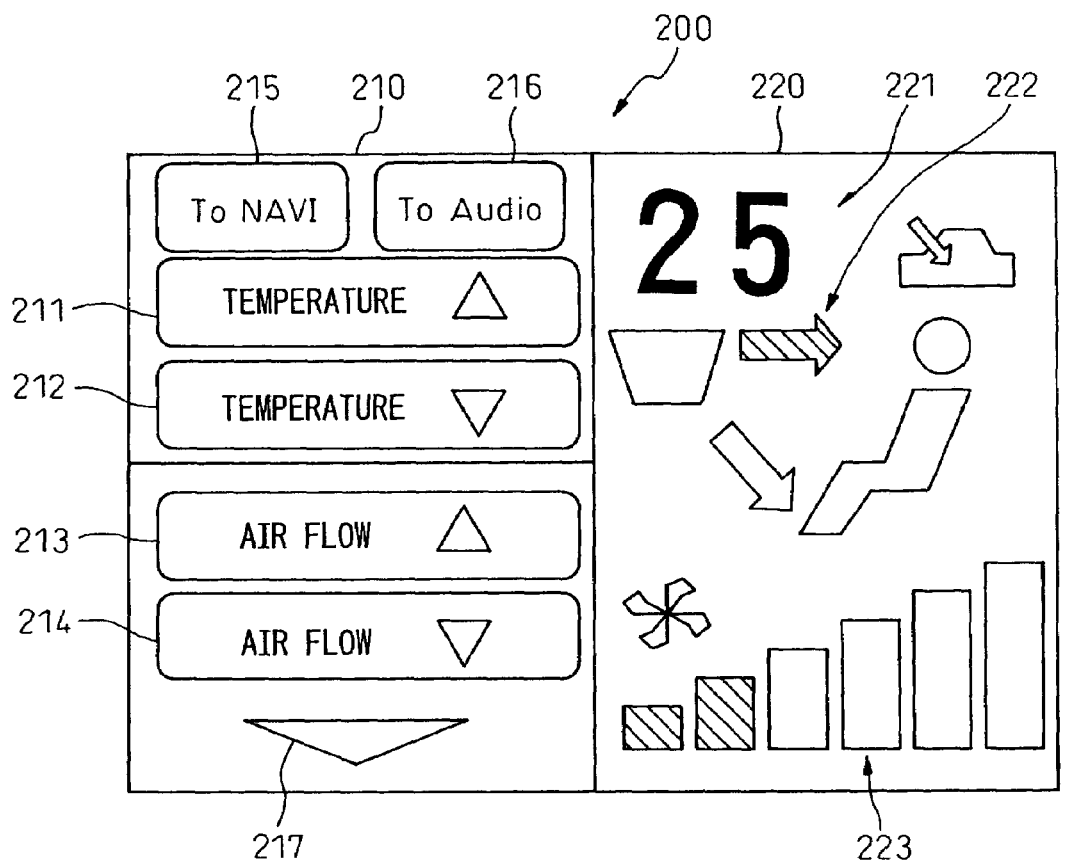
FIG. 3 shows an example of a display screen for operation of an air conditioning system according to the embodiment.

FIG. 3 shows an example of a screen for the air conditioning system. The screen 200 has an operation indicating area 210 and condition indicating area 220. The operation indicating area 210 has operation items 211 and 212 for changing a set temperature. The item 211 can be used to increase the temperature inside the vehicle. The operation item 222 can be used to decrease the temperature inside the vehicle. The operation indication area has also operation items 213 and 214 for changing a set airflow. The item 213 can be used to make the airflow strong in the vehicle. The item 222 can be used to make the airflow weak in the vehicle. Furthermore the operation indicating area 210 has screen-calling items 215 and 216 at the top of the area. The item 215 can be used to move the current screen to the screen for the navigation system. The item 216 can be used to move the current screen to the screen for the audio system. In addition, the operating indication area 210 has a calling item 217 at the bottom of the area. The item 217 can be used to move the current screen to the next lower level screen to select other items.

The condition indicating area 220 indicates the set temperature 221 (in FIG. 3, 25° C.), the set airflow direction 222 with arrows and the set airflow quantity 223 with a bar graph.

Figure 4:
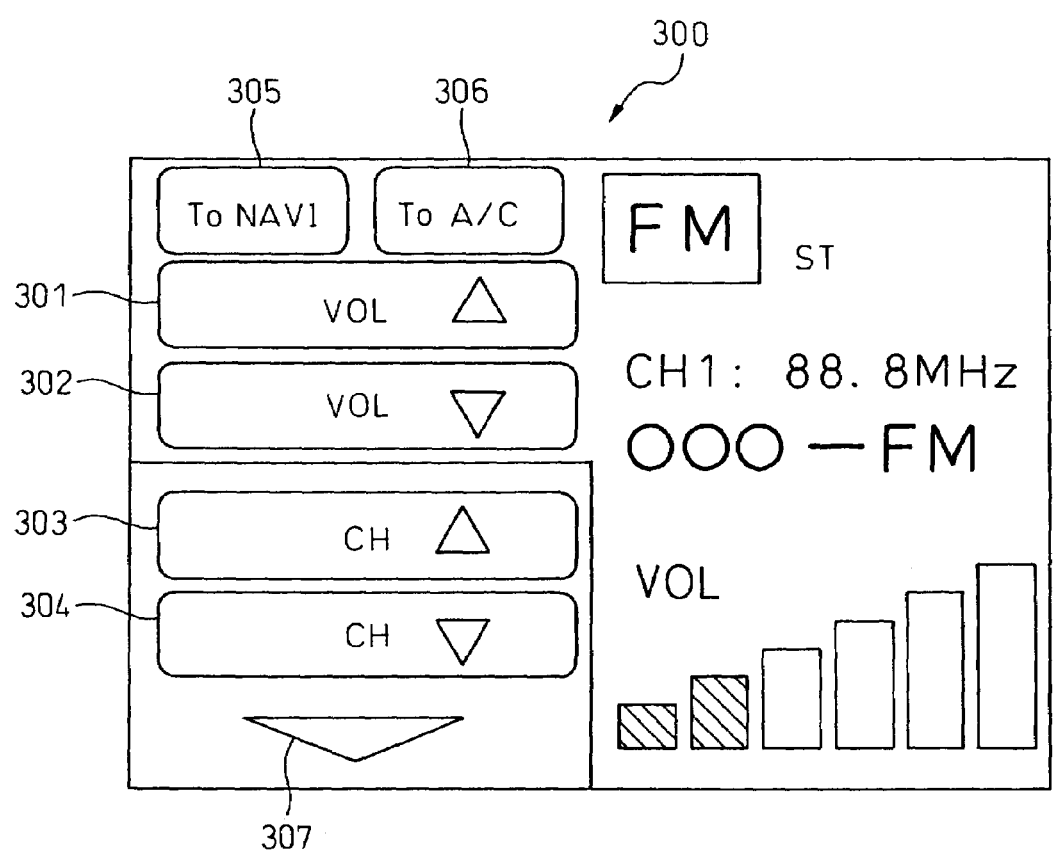
FIG. 4 shows an example of a display screen for operation of an audio system according to the embodiment.

FIG. 4 shows an example of the screen for the audio system. The screen 300 has also an operating indication area and condition indicating area.

The operating indication area has items 301 and 302 to change the volume (VOL) step by step. The item 301 can be used to increase the volume. The item 302 can be used to decrease the volume. The operating indication area has also items 303 and 304 to change frequency for tuning a channel (CH). The item 303 can be used to increase the tuning frequency. The item 304 can be used to decrease the tuning frequency. Furthermore the operating indication area has calling items 305 and 306 at the top. The calling item 305 can be used to move the current screen to the screen for the navigation system. The calling item 306 can be used to move the current screen to the screen for the air conditioning system. In addition, the operating indication area 210 has a calling item 307 at the bottom. The calling item 307 can be used to move the current screen to the next screen to select other items.

The condition indicating area indicates the conditions of audio system. In FIG. 4, the audio system receives a FM stereo program with 88.8 MHz of channel 1. The volume of speakers is indicated with bar graphs.

An operation of the operation device according to the embodiment will now be described, with reference of FIGS. 1 and 2.

First, the default screen 10 is shown by pushing the center button of a four direction switch 1b on the operating panel 1.

Next, any of calling items 101 for NAVI, 102 for A/C, 103 for Audio is selected by a four direction switch 1b. Then the selecting item is entered by the center button of four direction switch 1b. Thus the center button of four direction switch 1b can be used to call the initial screen or enter the selecting item. In addition, instead of using the calling items 101, 102 and 103, the rotary switch 1a can be used to select NAVI, A/C or Audio. Furthermore, a voice controlled operation (not shown) can be used to select and enter the item.

The screens 111, 121 and 131 can indicate several operation items. If the screen has the item to be selected, the item is selected and entered to perform the desired operation. If the screen does not have the item to be selected, a next screen at a lower level is called to find the desired item. The process continues until the desired item is found. Thus, in order to set a temperature and airflow in the air conditioning system, it is necessary to display the screen 200 in FIG. 3. In order to set the volume and a channel in the audio system, it is necessary to display the screen 300 in FIG. 4.

According to the present invention, as described detail below, the operating device can learn or memorize the operation after the operation has been repeated many times. As the result of the repeated operation, the operating device can move the frequently used items to display on another screen such as the initial screen. Thus, a user can simply and easily operate the operating device.

For example, if the user often uses items, such as an item of telephone number search in NAVI system, an item for setting a temperature in A/C system and an item for setting a channel of FM in Audio system, any of these items is moved to an initial screen in the related system to be used on the screen. FIG. 2 shows that the initial setting or default screen 10 are changed to the screen 20, which has the telephone number search item in form of a pop up menu 21.

If the center button of the four-direction switch 1b is pushed to call the initial screen after the operating device have been used in the predetermined period, which is set appropriately, the screen 20 instead of the screen 10 is displayed. Then, when the item for NAVI is indicated with a pointer, the telephone number search item, which the user has frequently used till then, appears on a pop up menu 21. In turn, the temperature setting item in A/C system or the FM channel setting item in Audio can appear on the pop up menu, if the items have been used more frequently than other items. The pop up menu is only an example for displaying the item. A menu in the user's view can be used in some cases.

Accordingly, the items that have been used more than the predetermined number of times can be used in the initial screen (at 0 level), even if the items are originally shown on a lower-level screen. In other words, as the operating device is used over a long time, the frequently used items can be shown at the highest-level screen or the 0 level screen. The operating device can be therefore used easily and conveniently.

FIG. 5 is a flow diagram of an embodiment according to the invention.

The program starts after the center button of the four-direction switch 1b on the operating panel 1 (FIG. 1) is pushed. In the initial stage, the default screen 10 is displayed (FIG. 2).

At step S1, it is determined whether or not a screen-calling item, which moves the current screen to the screen for the system (e.g. NAVI, A/C or audio) required by a user, was used. If the calling item was used, the flow goes to step S2. If the calling item is not used, the program returns to the start point.

At step S2, it is determined whether or not any operation item on the called screen has been used. When an operation item used, the flow goes to step S3. Otherwise, when no operation item is used or a screen-calling item is used, step S2 is repeated again.

A calling item can move the current screen to another system screen or the next level screen. If the screen moves to another system screen, then it will be determined whether or not an operation item on the other system screen was used.

At step S3, the number of operation times for each operation item is counted and stored in a storage device.

At step S4, it is determined whether or not any of the operation items is in the top rank of the number of the operation times. The operation items in the top rank can be listed on the pop up menu. When the popup menu already contains the menu items, the operation-time number is also compared to the operation number of each of the menu items. Additionally, the determination of listed items may be made once a week so as not to bother a user with frequent item-changes.

At step S5, the items can be displayed on the pop up menu in the top screen, after the operation items listed on the menu are determined. The listed items on the menu can be limited to only a few items, for example, three or four items, in order to be clearly visible. Thus, the operating device can obtain good operability.

As mentioned above, the condition for listing the item on the pop up menu is the number of previous uses of the item. The number of uses may be counted for a particular period. The particular period can be defined based on the driving times (e.g. example, morning times, evening times or the other specific driving times,), days, days of week, months and seasons. Further, the particular period can be also defined based on the driver's physical condition, which can be obtained from a driver's heart rate. Furthermore, the number of use of an operation item in air conditioning system can be counted in a specific outside-air temperature range, based on temperature information obtained by the outside thermometer.

It is obvious that a combination of any of above-mentioned conditions can be adopted for listing the item on the pop up menu. The items on the pop up menu can therefore be changed corresponding the conditions. If the operation item for setting a temperature in the air conditioning system is used more on holidays, the item for setting temperature can be listed on the pop up menu in holidays. If the item for setting airflow quantity is used more on weekdays, the item of setting the airflow can be listed on the pop up menu in weekdays.

In addition, the condition for listing the item on the pop up menu can be a statistically processed number of previous operations of the item.

In the embodiment, a TFT liquid crystal display is used as a display device. However, other liquid crystal display can be used. Furthermore, other display devices such as a vacuum fluorescent display (VFD), an electro luminescence display (EL) and so on can be used.

Further, the four-direction switch is used as an input device in the embodiment. Otherwise, the other input devices, e.g. an eight-direction switch, a joystick, a trackball and a touch panel can be used.

Systems operated by the operating device are not only above-mentioned systems, but also an audio-visual system including television or video displays and an information system such as a telephone system or an electronic mail system.

In the embodiment, the operating device comprises separated units which are connected each other by two-way communication. However, it is obvious that the operating device can be an all-in-one unit.

As mentioned above, the operation items on the pop up menu can be changed periodically, based on the number of operating times. Initially, the items on the menu can be changed only after a certain period longer than usual, because the items on the pop up menu are changed frequently and irregularly in the period. Alternatively, the items on the menu can be changed when the number of the operating times is more than the number of predetermined times.

The information on the items, such as the number of times of operating the item may be stored in a storage device or a portable storage medium. The information on the items may be rewritten from the outside. Thus, when the user buys a new vehicle, the information of the items can be used successively in the new vehicle. Further, the user can customize the items on the pop up menu by rewriting information to increase the required number of operating times of the items.

What is claimed is:

1. An operating device in a vehicle for operating multiple systems; comprising,
    a display unit including hierarchical display screens indicating screen-calling items to call a display screen of a system of said multiple systems and operating items to operate the system of said multiple systems, wherein a level 0 screen of the hierarchical display screens has at least the screen-calling items,
    an operating panel to select and use said screen-calling items and operating items on the display screens, and
    an electronic control unit receiving signals from the operating panel and controlling the display unit, wherein the number of times of use of each operation item in every system is counted and, if an operation item has been used more frequently than other operation items in every system, the more frequently used operation item is moved to a higher-level screen.

2. The operating device in the vehicle of claim 1, wherein said display unit further has a level 1 screen to which the level 0 screen moves by using said screen-calling items on the level 0 screen and a level 2 screen being a lower screen than the level 1 screen, the level 1 and 2 screens having operating items and screen-calling items to call a lower level screen of the same system or a display screen of a different system of the multiple systems.

3. The operating device in the vehicle of claim 2, wherein if the screen-calling items on the level 1 screen are used, it is determined whether an operating item is used on a screen to which the level 0 screen moves by using said screen-calling items on the level 1 screen.

4. The operating device in the vehicle of claim 1, wherein the timing of said move of the operation item to the higher-level screen is determined based on a predetermined condition.

5. The operating device in the vehicle of claim 4, wherein said predetermined condition is to move the operation item only once during a predetermined period.

6. The operating device in the vehicle of claim 1, wherein said multiple systems contain at least two systems of a navigation system, an air conditioning system and an audio system.

7. The operating device in the vehicle of claim 1, further comprising electric control units controlling each of said multiple systems having two way communications with said electronic control unit controlling the display unit.

8. The operating device in the vehicle of claim 1, wherein said electronic control unit controlling the display unit comprises a portable storage medium or a device to store counted times of use of each operational item.

9. The operating device in the vehicle of claim 1, wherein a level 1 screen comprises a condition indicating area graphically indicating present conditions and an operation indicating area indicating operation items.

10. An operating device in a vehicle for operating a plurality of systems, the operating device comprising:
    a display unit having multiple level display screens for each of the plurality of systems, each of the multiple level display screens having screen-calling items to call a different one of the multiple level display screens, a portion of the multiple level display screen having operating items to operate a respective system of the plurality of systems;

an operating panel to select and use the screen-calling items and the operating items on the multiple level display screens;

an electronic control unit receiving signals from the operating panel and controlling the display unit; wherein the number of times of use of each operation item of each of the plurality of systems is counted and if a first operation item has been used more frequently than a second operation item, the first operation item is moved to a higher-level screen.

* * * * *